Figures 1, 2:
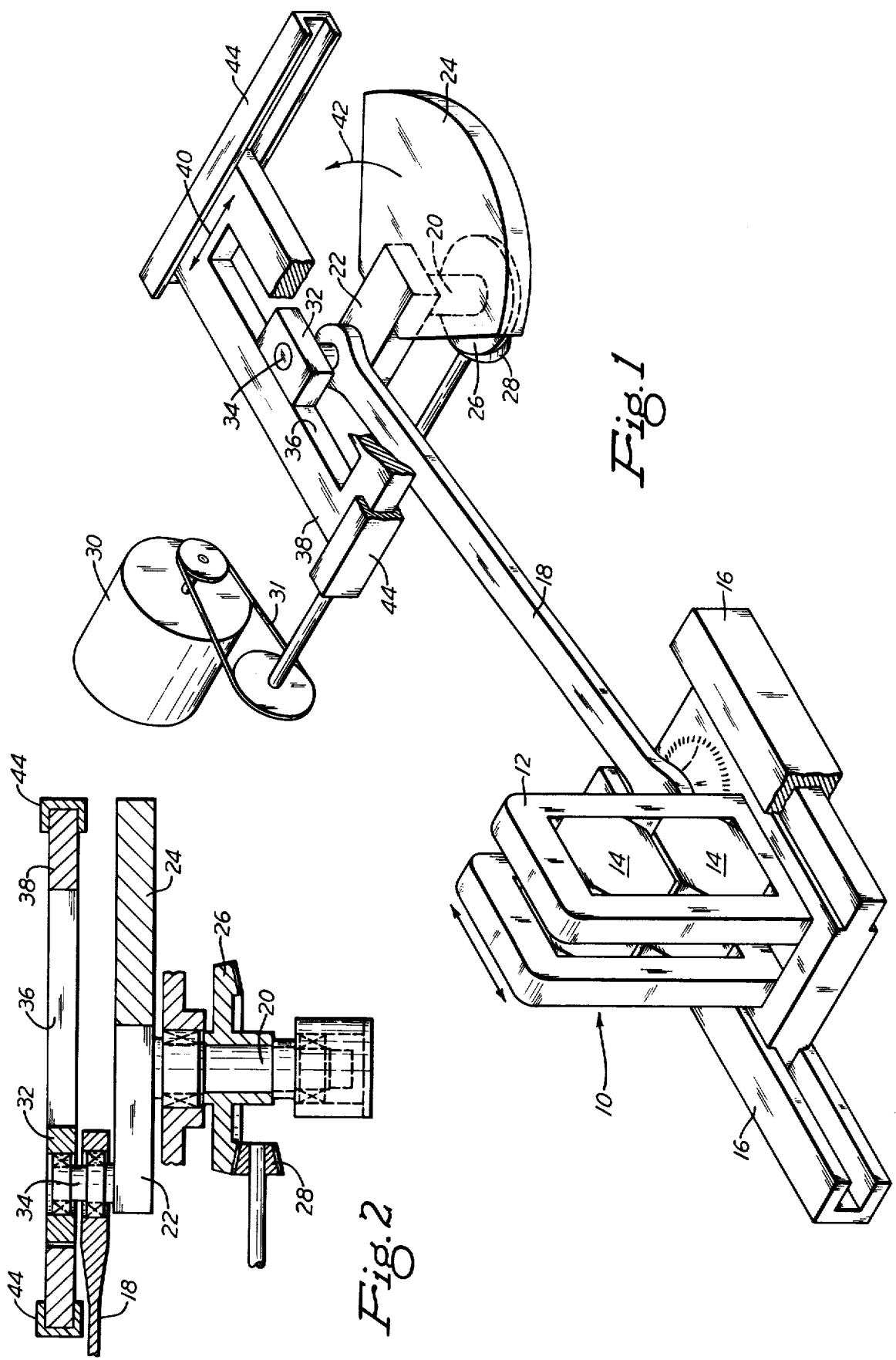

United States Patent [19]

Miller et al.

[11] 4,052,898
[45] Oct. 11, 1977

[54] CRANK DRIVE SYSTEM FOR COLD PILGER MILLS DRIVE OR THE LIKE

[75] Inventors: Charles Leroy Miller, New Wilmington, Pa.; Harry Calhoon Ledebur, Canfield, Ohio

[73] Assignee: Wean United, Inc., Pittsburgh, Pa.

[21] Appl. No.: 722,906

[22] Filed: Sept. 13, 1976

[51] Int. Cl.² ............... B21B 17/00; B21B 35/00
[52] U.S. Cl. ............................. 72/214; 72/208; 72/249; 74/590; 74/44
[58] Field of Search ............ 72/214, 249, 208, 220, 72/209; 74/591, 44, 590

[56] References Cited

U.S. PATENT DOCUMENTS

| 3,584,489 | 6/1971 | Peytavin | 72/208 |
| 3,890,821 | 6/1975 | Gerretz et al. | 72/208 |

*Primary Examiner*—Milton S. Mehr
*Attorney, Agent, or Firm*—Daniel Patch; Suzanne Kikel

[57] ABSTRACT

The disclosure of the present invention relates to a torque and mass compensating counterweight system employed with the drive of a cold pilger rolling mill. The counterweight is connected directly to the crank by a sliding block, displaceable in a slot provided in the counterweight, in which the counterweight is arranged to reciprocate 90° out of phase with the crank and is arranged in guides to move in a plane parallel to the direction of movement of the mill.

10 Claims, 2 Drawing Figures

CRANK DRIVE SYSTEM FOR COLD PILGER MILLS DRIVE OR THE LIKE

As exemplified in U.S. Pat. Nos. 2,924,106 and 3,335,593, it is well known to employ torque and mass counterweight systems to compensate for the detrimental torques created by the cyclic acceleration and deceleration of the saddle of the cold pilger rolling mill utilized to produce high quality metal tubing. A current and accepted design of such a system is to provide a pair of connecting rods between the counterweight and saddle in which the counterweight itself is arranged in a pit connected also to the crank by a pair of connecting rods, very similar in general to the two forms illustrated in the aforesaid U.S. Pat. No. 3,335,593.

It is obvious that such systems require an inordinately large pit to receive the counterweight which substantially adds to the expense of the mill along with the cost of the long connecting rods. Moreover, such systems have in the past inherently involved numerous maintenance problems.

The present invention has for its principle object the providing of a counterweight system useful not only for cold pilger mills, but any similar reciprocable mass that will generally simplify the construction of the system and hence its cost. Moreover, it will allow a single connecting rod to be employed between the crank and mill or like reciprocatory devices.

More particularly, the present invention provides in a drive system for a cold pilger mill, or the like, a counterweight system connected directly to the crank without the need of a connecting rod, in which the counterweight is arranged in a plane parallel to the direction of movement of the reciprocable mass, such as a rolling mill.

A still further object of the invention is to provide for a counterweight to be connected to a vertically arranged crank by a horizontally displaceable sliding block received in a slot formed in the counterweight contained by guides in a manner to move horizontally in a direction parallel and perpendicular to the direction of the movement of the mill, and in which drive means is provided connected to the crank, means for connecting said crank to the reciprocatory mill, the counterweight being connected to the crank in a manner to impart an oscillatory movement to the counterweight having a cycle substantially equal to that of the reciprocable movement of said crank and which is out of phase with said reciprocatory movement of the crank, whereby the acceleration and deceleration torques of said counterweight compensates respectively, the acceleration and deceleration torques of said reciprocatory mill during the reciprocatory movement of the latter.

These objects, as well as other novel features and advantages of the present invention, will be better appreciated when the following description of one embodiment is read along with the accompanying drawings of which:

FIG. 1 is a perspective diagrammatial view of the invention as applied to a cold diagrammatical rolling mill, and FIG. 2 is a sectional view of a portion of the drive shown in FIG. 1.

In FIG. 1 there is illustrated diagrammatically a cold pilger mill and its drive. Since the mill itself is well known in the art, as well as portions of the mill drive, a detailed discussion will not be given. The mill 10 is provided with a Saddle 12 that receives two cooperative dies 14, the saddle 12 being guided for reciprocation in the direction of the tubing path of travel by a parallel arranged pair of guides 16. The movement of the mill is imparted by a single connecting rod having one end connected to the base of the saddle 12 and its opposite end to the crank system. While the employment of a crank system with associated counterweight systems is well known, the present invention provides an improved crank and counterweight system and one that allows the employment of a single crank throw and connecting rod.

In FIGS. 1 and 2 there is provided a vertically arranged driven shaft 20 of the crank system, the crank itself being identified at 22 and arranged horizontally and to which is secured to its inner end a segmental balancing counterweight 24. To the bottom of the shaft 20 there is drivenly secured a bevel gear 26 which is driven by a bevel gear 28 connected to an electrical motor 30 through a belt drive 32. The arrangement of the crank 22 in the horizontal position allows a block 32 to be secured to the crank by a pin 34. The block 32 is received in a slot 36 formed in a second sliding block 38, the block 38 is arranged 90° out of phase with the crank in accordance with the teachings of the aforesaid U.S. Patents, and reciprocated in the direction of the arrows 40, on rotation of the crank 22 in the direction of the arrow 42, by a pair of parallel guides 44. In light of the above description and the illustration of FIG. 1 the compactness of the crank and counterweight system is believed very apparent.

In operation the crank and counterweight system described will perform similar to previous counterweights as illustrated in the aforesaid U.S. Patents, the counterweight being connected so that oscillatory movement is imparted thereto, in which it will have a cycle substantially equal to the cycle of the crank, but 90° out of phase with the crank, thereby compensating for the mass and torque characteristics of the mill 10.

In accordance with the provisions of the patent statutes, we have explained a preferred embodiment of our present invention and have illustrated and described what we consider to represent the best embodiment thereof.

I claim:

1. In combination with a reciprocating mass such as a cold pilger rolling mill having a pass line,
    a drive means,
    crank means connected to said drive means,
    means for connecting said crank means to said reciprocating mass,
    a counterweight means arranged in a plane parallel to the direction of movement of said reciprocating mass, and substantially coincident to said pass line with due allowance for passage of the product,
    means for connecting said counterweight means to said crank means in a manner to impart an oscillatory movement to said counterweight means,
    said oscillatory movement being in a perpendicular direction relative to said direction of movement of said mass and which oscillatory movement has a cycle substantially equal to that of the reciprocating movement of said mass and which is out of phase with said reciprocating movement of said mass, whereby the acceleration and deceleration of said
    counterweight means compensate respectively the acceleration and deceleration torques of said reciprocating mass during the reciprocating movement of the mass.

2. In combination with a reciprocating mass according to claim 1, including means for arranging said crank means perpendicularly in a generally horizontal plane defining the path of movement of said reciprocating mass.

3. In combination with a reciprocating mass according to claim 1 wherein said drive means includes a gear connected to one end of said crank means.

4. In combination with a reciprocating mass according to claim 1, means for rotatably supporting said crank means in a direction perpendicular to a plane coincident to the path of movement of said reciprocation mass, and means for maintaining said counterweight means in said perperdicular position in a plane containing the axis of said crank means.

5. In combination with a reciprocating mass according to claim 1, including a balancing counterweight means connected to said crank means in a manner to balance at least a portion of the inertia of the throw portion of the said crank means, said mass, and said means for connecting said crank means to said mass.

6. In combination with a reciprocating mass according to claim 1, wherein said counterweight means is connected directly to said crank means.

7. In combination with a reciprocating mass according to claim 1, wherein said connecting means comprises a single connecting rod.

8. In combination with a reciprocating mass according to claim 1, wherein said counterweight means is provided with a slot,
   a sliding block received in said slot,
   said means for connecting said counterweight means to
   said crank means comprising a pin connected to said block.

9. In combination with a reciprocating mass according to claim 8, guiding means provided for guiding said counterweight means during its oscillatory cyclic movement.

10. In combination with a reciprocating mass such as a cold pilger rolling mill having a pass line,
   a drive means for said mill,
   a crank means connected to said drive means,
   means for connecting said crank means to said mill to effect said reciprocation thereof,
   a first counterweight means arranged in a plane parallel to the direction of movement of said reciprocating mill,
   means for connecting said first counterweight means to said crank means in a manner to impart an oscillatory movement to said counterweight means, said oscillatory movement being in a perpendicular direction relative to said direction of movement of said mill, and which oscillatory movement has a cycle substantially equal to that of the reciprocating movement of said mill and which is out of phase with said reciprocating movement of said mill, whereby the acceleration and deceleration torques of said counterweight means compensate, respectively, the acceleration and deceleration torques of said reciprocating movement of said mill, and
   a second counterweight means connected to said crank means in a manner to balance at least a portion of the inertia of the throw of said crank means, said mill, and said means for connecting said crank means to said mill,
   said two counterweight means and said means for connecting said first counterweight means to said crank means being arranged in a plane substantially coincident to said pass line with due allowance for passage of the product.

* * * * *